(12) United States Patent
Foster et al.

(10) Patent No.: US 8,186,302 B1
(45) Date of Patent: May 29, 2012

(54) SYSTEM FOR COATING REPTILE FEED WITH A SUPPLEMENT

(76) Inventors: Natasha Foster, Roswell, GA (US);
David K. Foster, Roswell, GA (US)

(*) Notice: Subject to any disclaimer, the term of this patent is extended or adjusted under 35 U.S.C. 154(b) by 327 days.

(21) Appl. No.: 12/384,947

(22) Filed: Apr. 10, 2009

(51) Int. Cl.
*A01K 5/00* (2006.01)
(52) U.S. Cl. .................................... 119/51.01
(58) Field of Classification Search ............ 119/51.01, 119/462, 464, 475, 515, 6.5; 118/19, 308, 118/309; 426/289–296; 222/108, 111, 189.02, 222/189.03, 189.06
See application file for complete search history.

(56) References Cited

U.S. PATENT DOCUMENTS

| | | | | |
|---|---|---|---|---|
| 1,842,101 A | * | 1/1932 | Kaufmann | 118/19 |
| 3,901,191 A | * | 8/1975 | Smith | 119/51.03 |
| 4,586,463 A | * | 5/1986 | Braeuner | 119/462 |
| 5,435,266 A | * | 7/1995 | Carson | 119/464 |
| 5,544,621 A | | 8/1996 | Haurilesko | |
| 5,630,374 A | | 5/1997 | Cunningham | |
| 5,704,466 A | | 1/1998 | Moster | |
| 6,338,315 B1 | | 1/2002 | Stillman | |
| 6,758,162 B1 | | 7/2004 | Van Heygen | |
| 7,174,847 B1 | * | 2/2007 | Hulteen, III | 119/6.5 |
| 2008/0078328 A1 | * | 4/2008 | Orup | 119/51.01 |

\* cited by examiner

*Primary Examiner* — Rob Swiatek
*Assistant Examiner* — Kathleen Iwasaki
(74) *Attorney, Agent, or Firm* — Montgomery Patent & Design, LLC; Robert C. Montgomery; Joseph T. Yaksich

(57) ABSTRACT

The present invention discloses an apparatus and system that applies powder-based food additives for feeder insects that are used to feed reptiles. The apparatus takes the form of a cube-shaped box with a side dimension of approximately six (6) inches. A screen-shaped barrier is provided about two-thirds (⅔) from the top which has a hinged opening side. Directly below the screen is a sliding barrier that is removed and replaced from the side of the box. Insects, such as crickets, are coated and released into the container holding the reptile for feeding purposes. The use of this system allows one (1) to easily ensure that their pet reptile is provided with adequate levels of proteins, vitamins and minerals without the necessity of handling or touching feeder insects in an efficient manner.

2 Claims, 5 Drawing Sheets

SYSTEM FOR COATING REPTILE FEED WITH A SUPPLEMENT

RELATED APPLICATIONS

The present invention was first described in a notarized Official Record of Invention on Jan. 29, 2007, that is on file at the offices of Montgomery Patent and Design, LLC, the entire disclosures of which are incorporated herein by reference.

FIELD OF THE INVENTION

The present invention relates generally to a device and system for applying a supplement on reptile feed.

BACKGROUND OF THE INVENTION

In order to ensure a balanced diet for their reptile pets, many people "dust" feeder insects with powdered vitamins, nutrients and/or proteins. In this process, a group of feeder insects is placed in a plastic bag with the powder and then fed to the reptile. However, there are several disadvantages presented by this method. First, the user is required to touch the insects which many find distasteful. Second, in the process of touching, the powder can be wiped off, and/or germs/bacteria can be transferred from the human user to the insect which subsequently may negatively affect the health of the reptile. Finally, there is no easy and secure way to hold the semi-used powder or return it to the powder container. If the user tries to shake the insects out of the bag, there is a strong possibility that the excess powder will fall into the reptile enclosure thus fouling it. Accordingly, there exists a need for a means by which feeder insects can coated with food supplements in an easy manner without the disadvantages as described above. The development of the device and method of use thereof described herein fulfills this need.

There have been attempts on the past to invent feeding devices for pets. U.S. Pat. No. 6,758,162 issued to Van Heygen discloses a reptile feeder that comprises a structure having a chamber in which the insects can move about, a cover that provides access to the chamber for introducing insects and powder supplements to the chamber, and a small port with a manually removable port plug for enabling the insects to exit the chamber to the terrarium when the plug is removed. Unfortunately, this patent does not appear to disclose a square-shaped container with removable shelves that permits the application of powder or liquids to a reptile's feed prior to feeding.

U.S. Pat. No. 6,338,315 issued to Stillman discloses a live feeder which is made of a transparent material, and has mounting elements for mounting the feeder container on an enclosure for a pet and a self-closing opening for capturing insects from the feeder container. Unfortunately, this patent does not appear to disclose a device that permits the application of powder or liquid to a reptile's food.

U.S. Pat. No. 5,630,374 issued to Cunningham discloses a cricket dispenser for storing and dispensing crickets comprising a hollow tube, with a top for the container that has an interior aperture for accommodating the tube in a substantially-vertical attitude when inserted. Unfortunately, this patent does not appear to describe a coating device for reptile food.

U.S. Pat. No. 5,544,621 issued to Haurilesko discloses a live insect feeder for use with a tank comprising a container having an opening through which an adult flightless insect can pass, and a tacky substance encircling the opening on the outside of the container. Unfortunately, this patent also does not appear to disclose a coating device for reptile food.

SUMMARY OF THE INVENTION

In light of the disadvantages as previously discussed in the prior art, it is apparent that there is a need for a device and method for coating reptile feed with a supplement within a container comprising a hinged lid, a reptile feed shelf and a solid insert.

An object of the reptile feed coating device is to aid in the application of nutritional or medicinal powders to reptile feed in preparation for administration to insectivorous reptiles normally kept in captivity.

Another object of the reptile feed coating device is to eliminate the need for the caregiver to manipulate the reptile feed manually in order to coat reptile feed with powder prior to feeding to a reptile.

A further object of the reptile feed coating device is to permit the application of any supplement to any form of reptile feed including, but not limited to: crickets, flies, insects or other solid reptile feed.

An aspect of the reptile feed coating device comprises a container with a square-shaped cross-section which further comprises a front panel, two (2) side panels, a rear panel and a base panel. The front panel, two (2) side panels, rear panel and base panel are bonded together to form a box-shaped device with a top opening.

Another aspect of the retile feed coating device comprises a container that further comprises, at its top surface, a lid. The lid is pivotally connected to the container by a pair of hinges. The lid comprises a latching mechanism to secure the lid to the top of the container.

A further aspect of the reptile feed coating device comprises a base panel that extends along the bottom of the container and acts to capture unused powder during application to the reptile feed that does not adhere to the reptile feed. The base panel further comprises a set of four (4) feet that are attached to the bottom corners of the base panel.

Still another aspect of the reptile feed coating device comprises two (2) side panels that further comprise a set of reptile feed shelf supports which are integrally formed into the two (2) side panels. The reptile feed shelf supports comprise multiple protrusions integrally formed or adhesively attached and positioned to the inside surface of the two (2) side panels above and below the reptile feed shelf in such a manner as to secure the reptile feed shelf within said container.

Still a further aspect of the reptile feed coating device comprises a reptile feed shelf comprising a plurality of apertures contained thereupon to form a grate-like structure or may be a support frame surrounding a screen. The reptile feed shelf supports the reptile feed when powder is being applied to the reptile feed.

Yet another aspect of the reptile feed coating device comprises a solid insert that acts as a barrier to the unused powder resting on the base panel. The solid insert, when placed in position within the container is located between the reptile feed shelf and the base panel.

Yet a further aspect of the reptile feed coating device further comprises a solid insert shield that is attached to the inside of the rear panel that permits the movement of the solid insert into the container and seals the opening when the solid insert is not in place within the container.

A method of utilizing the device may be achieved by performing the following steps: insuring that the reptile feed shelf is in place; lifting the lid of the container; placing the reptile feed onto the reptile feed shelf; dispersing the desired powder through the opening at the top of the container; closing the lid of container and securely latching the lid utilizing the latching mechanism; inverting or shaking the container in such a manner as to cover the reptile feed; placing the container in an upright position and inserting the solid insert through the opening in the rear panel of the container; opening the lid of the container and inverting the container over the reptile's feeding area; observing that only the coated reptile feed leaves the container and not any unused supplement; returning the container to an upright position; closing the container utilizing the lid and latching mechanism; removing the solid insert from the container; discarding the unused powder into an appropriate receptacle; cleaning the device as desired and storing the device for subsequent use; and, enjoying the convenience and benefits of the device for coating reptile feed with powder.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
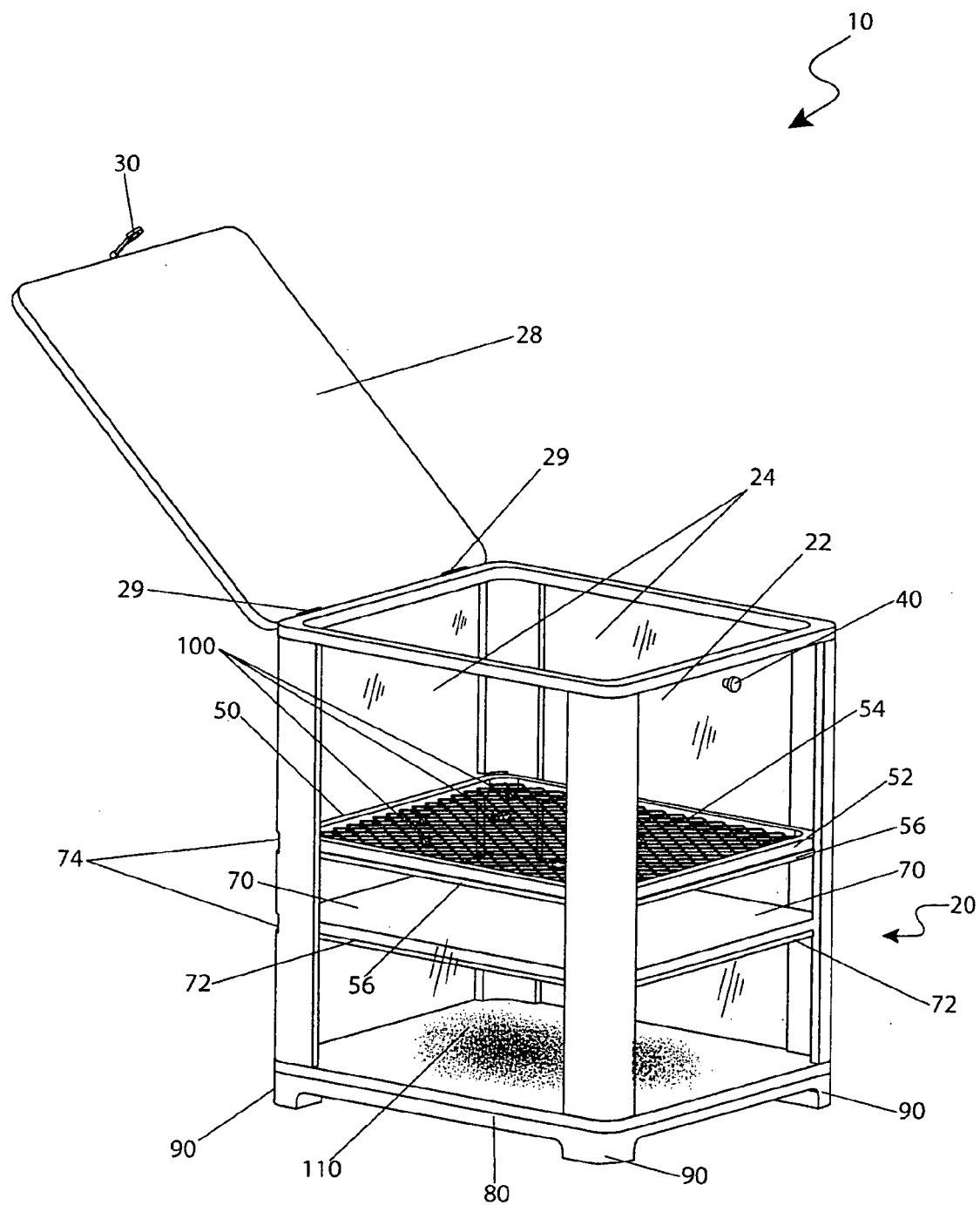
FIG. 1 is a side perspective view of the device for coating reptile feed with powder 10 according to a preferred embodiment of the present invention.

DESCRIPTIVE KEY 10 device for coating reptile feed with powder
20 container
22 front panel
24 side panel
25 rear panel
28 lid
29 hinge
30 latching mechanism
40 latch catch
50 reptile feed shelf
52 reptile feed shelf frame
54 reptile feed shelf screen
56 reptile feed shelf support
70 solid insert
72 solid insert support rail
74 opening
76 solid insert shield
80 base panel
90 foot
100 reptile feed
110 powder
120 direction of withdrawal

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for coating reptile feed with powder (herein described as the "device") 10, which provides a container 20 comprising a hinged lid 28, a reptile feed shelf 50 and a solid insert 70. The device is designed to aid in the application of nutritional or medicinal powders 110 to reptile feed 100 in preparation for administration to insectivorous reptiles normally kept in captivity. This device obviates the need for the caregiver to manipulate the reptile feed 100 manually in order to coat the reptile feed 100 with powder 110 prior to feeding to a reptile.

Referring now to FIG. 1, a side perspective view of the device 10, according to the preferred embodiment of the present invention, is disclosed. The device 10 comprises a container 20 with a square shaped cross-section which further comprises a front panel 22, two (2) side panels 24, a rear panel 25 and a base panel 80. It is envisioned that said panels 23, 24, 25 & 80 would be manufactured of a transparent plastic such as, but not limited to: polyvinyl chloride or other plastics, however, said panels 23, 24, 25 & 80 could be formed of metal or wood and as such should not be construed as a limiting feature of the invention. The front panel 22, two (2) side panels 24, rear panel 25 and base panel 80 are bonded together to form a box-shaped device such that the top of the container 20 remains uncovered. The container 20 further comprises, at its top surface, a lid 28 which fits to cover the top opening of the container 20 being fabricated using similar materials as the aforementioned panels 23, 24, 25. The lid 28 is pivotally connected to the container 20 by a pair of hinges 29 located at the top portion of the rear panel 80. The lid 28 possesses a latching mechanism 30 to secure the lid 28 to the top of the container 20 through a latch catch 40 positioned on upper surface of the front panel 22. The latching mechanism 30 is envisioned to be a "C"-type catch mechanism which engages the latch catch 40; however, it is envisioned that other types of latches may be used to secure the lid 28 of the device 10 and as such, this should not be construed as a limiting factor of the device. A base panel 80 comprises a solid piece of material envisioned to be plastic, as used in the other panels, but capable of being any material that is capable of supporting the weight of the device 10. The base panel 80 extends along the bottom of the container 20 and acts to capture unused powder 110 during application to the reptile feed 100 that does not adhere to the reptile feed 100. The base panel 80 further comprises a set of four (4) feet 90 that are attached to the bottom corners of the base panel 80. The feet 90 may be (as illustrated in FIGS. 1 & 2) molded into the base panel 80 or may be separately attached to the base panel 80 and as such should not be considered a limiting feature of the invention.

The two (2) side panels 24 further comprise a set of reptile feed shelf supports 56 which are integrally formed into the two (2) side panels 24 at opposing vertical locations on the inside surface of the container 20. Said set of reptile feed shelf supports 56 comprise multiple protrusions integrally formed or adhesively attached and positioned to the inside surface of the two (2) side panels 24 above and below the reptile feed shelf 50 in such a manner as to secure the reptile feed shelf 50 within said container 20. The reptile feed shelf 50 may also be permanently affixed and bonded to the inside of the side panels 24 in such a manner that it is incapable of being displaced when the container 20 is manipulated as described below. Either configuration should be considered acceptable and as such should not be considered a limiting feature of the preferred embodiment. It is envisioned, in the preferred embodiment, that said reptile feed shelf supports 56 are posts or rails that extend the entire width of the inside surface of the two side panels 24 but a person with skill in the art and may recognize other means of support that would act in a similar manner and as such should not be construed as a limiting feature of the device. The set of reptile feed shelf supports 56 serve to support and secure the reptile feed shelf 50 in place. The reptile feed shelf 50 is envisioned to be made with a plurality of apertures contained thereupon to form a grate-like structure or may be a support frame 52 surrounding a screen 54 (as shown in FIGS. 1 through 4), either configuration being acceptable in the preferred embodiment, and as such should not be considered a limiting feature of the device 10. In operation, the reptile feed shelf 50 supports the reptile feed 100 when powder 110 is being applied to the reptile feed 100 through the top opening of the container 20. The reptile feed shelf 50 supports the powder-coated reptile feed 100 and permits the passage of unused powder 110 through apertures contained thereon the reptile feed shelf 50 to rest upon the bottom of the container 20.

Figure 2:
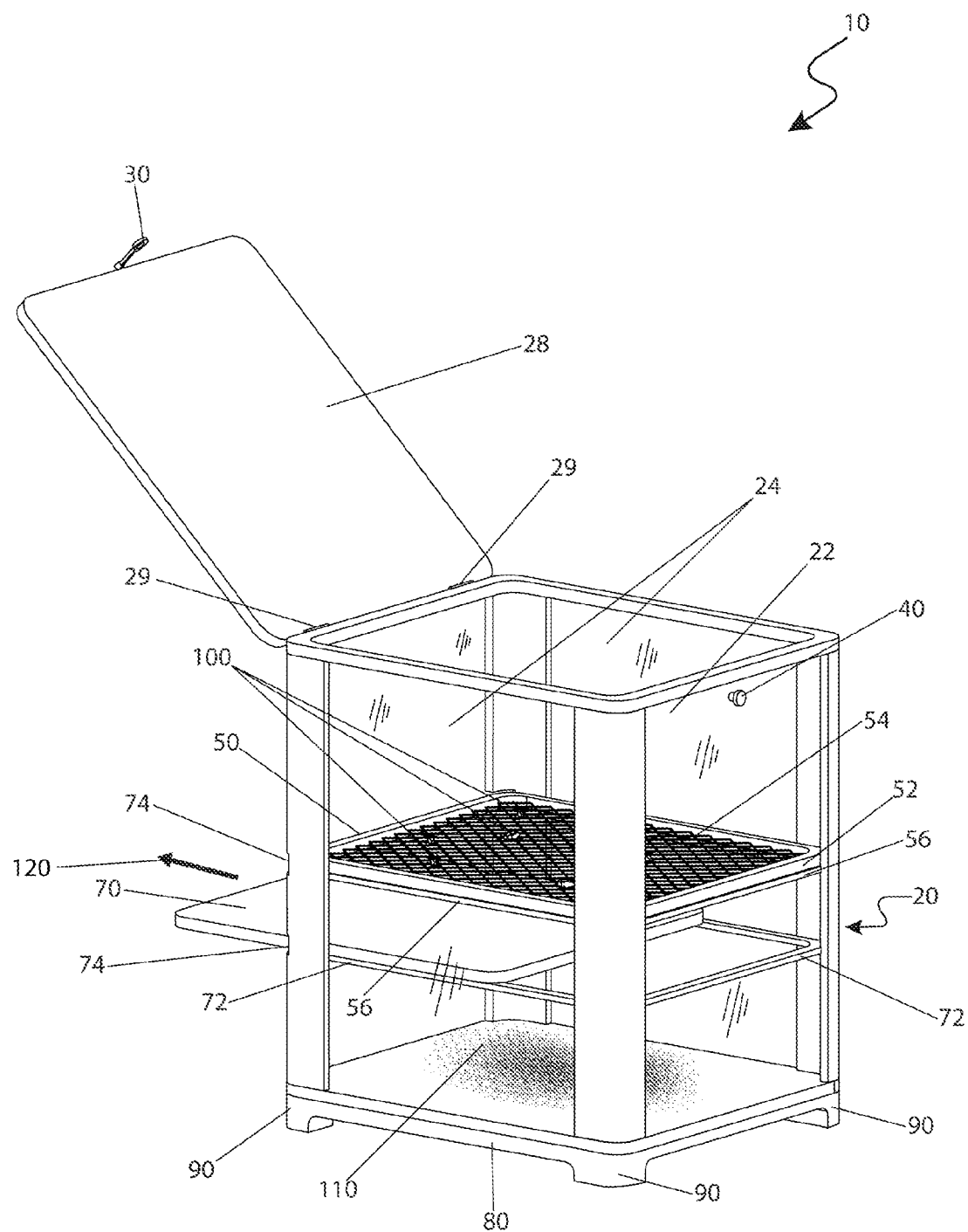
FIG. 2 is a side perspective view of the device for coating reptile feed with powder 10, with the solid insert 70 partially withdrawn according to a preferred embodiment of the present invention.

Referring now to FIG. 2, a side perspective view of the device 10 with the solid insert 70 partially withdrawn from the container 20, according to the preferred embodiment of the present invention, is further disclosed. In this figure, the solid insert 70 is shown partially withdrawn 120 from the container 20 and further illustrates the use of the set of solid insert support rails 72. The solid insert 70, in operation, acts a barrier to the unused powder 110 resting on the base panel 80. The solid insert 70, when placed in position within the container 20, is located between the reptile feed shelf 50 and the base panel 80 and acts as a barrier to prevent extraneous powder 110 resting on the bottom of the container 20 from escaping through the top of the container 20 when the container 20 is inverted. The solid insert 70 comprises a solid piece of material which is slidingly inserted into the container 20 therethrough an opening 74 in the rear panel 25, so that the solid insert 70 rests upon the set of solid insert support rails 72. The set of solid insert support rails 72 are located at opposing vertical locations thereon the side panels 24 and are envisioned to be manufactured of the same material as the container 20. Although in the preferred embodiment, the solid insert supports 72 are envisioned to be a set of rails, a person of skill in the art would recognize that other means of support the solid insert 70 are capable of being utilized such as, but not limited to clips; support pegs and the like and as such should not be considered a limiting feature of the preferred embodiment. The device further comprises a solid insert shield 76 that is attached to an outer surface of the rear panel 25 in a manner more fully disclosed herein below.

Figure 3:
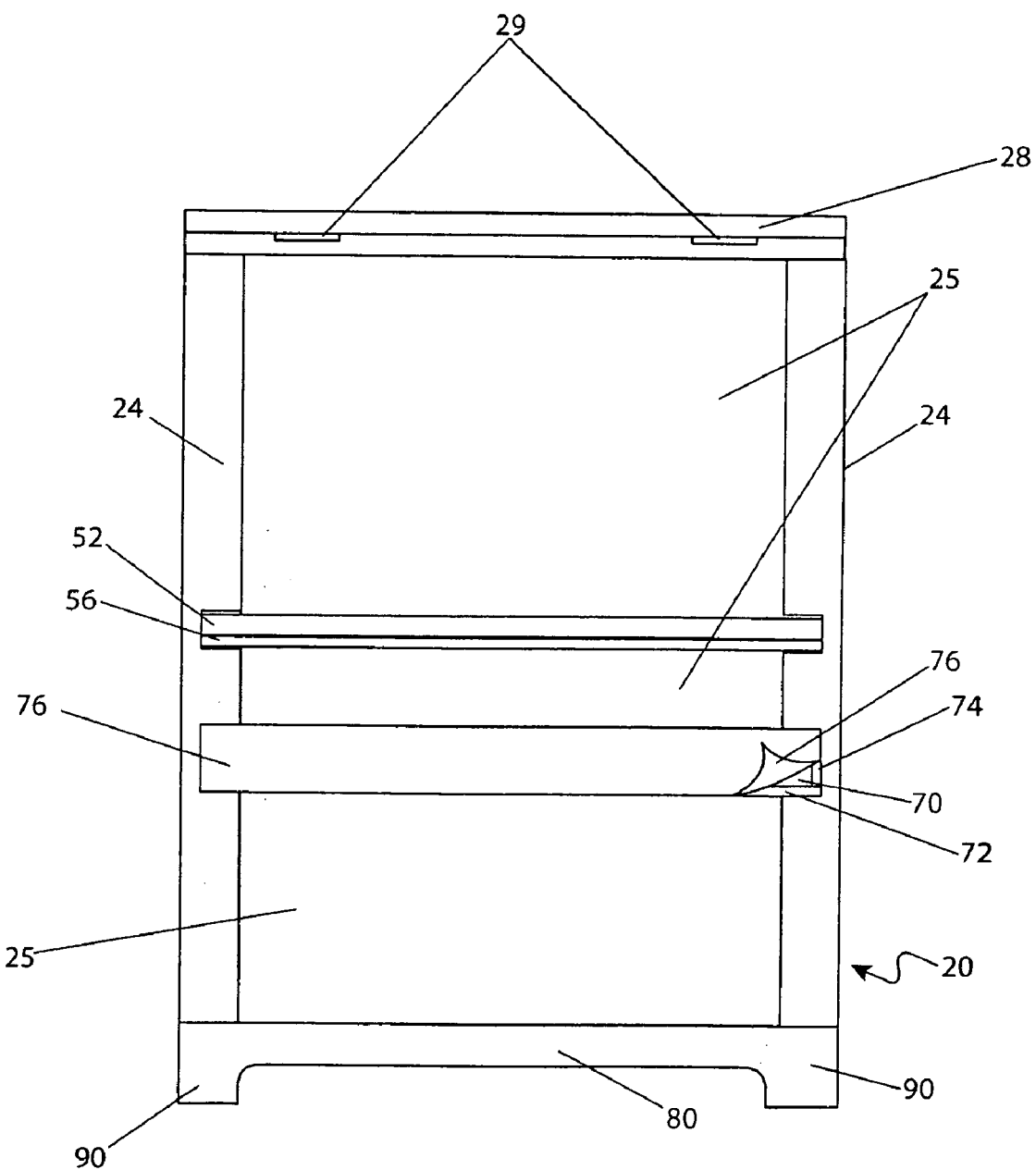
FIG. 3 is a rear view of the device for coating reptile feed with powder 10, with the lid 28 of the device 10 in a closed position according to a preferred embodiment of the present invention.

Referring now to FIG. 3 a rear view of the device 10, with the lid 28 of the device 10 in a closed position according to the preferred embodiment of the present invention, is further disclosed. In this figure, the position of the hinges 29 for the lid 28 are illustrated as is the position of the opening 74 to allow the solid insert 70 to enter the container 20 through the rear panel 25. The hinges 29 are envisioned to be standard pin-type hinges 29 but any type of hinge 29 that permits the lid 28 to be removed from the device 10 and replaced may be used and as such should not be considered a limiting feature of the invention. The opening 74 in the rear panel 25 is positioned in a desired location below the reptile feed shelf 50 and above the bottom panel 80 such that the solid insert 70 may slide through the opening 74 and the solid insert shield 76 thereonto and upon the solid insert support rails 72. Although the preferred embodiment contemplates the use of a pivotally connected hinged type lid 28 covering for the container, one could also envision a lid 28 constructed in such a manner so that the lid 28 forms a friction fit with the top of the container 20 eliminating the need for hinges 29. Accordingly, the necessity for hinges 29 located upon the lid 28 should not be construed as a limiting feature of the device 10.

Figure 4:
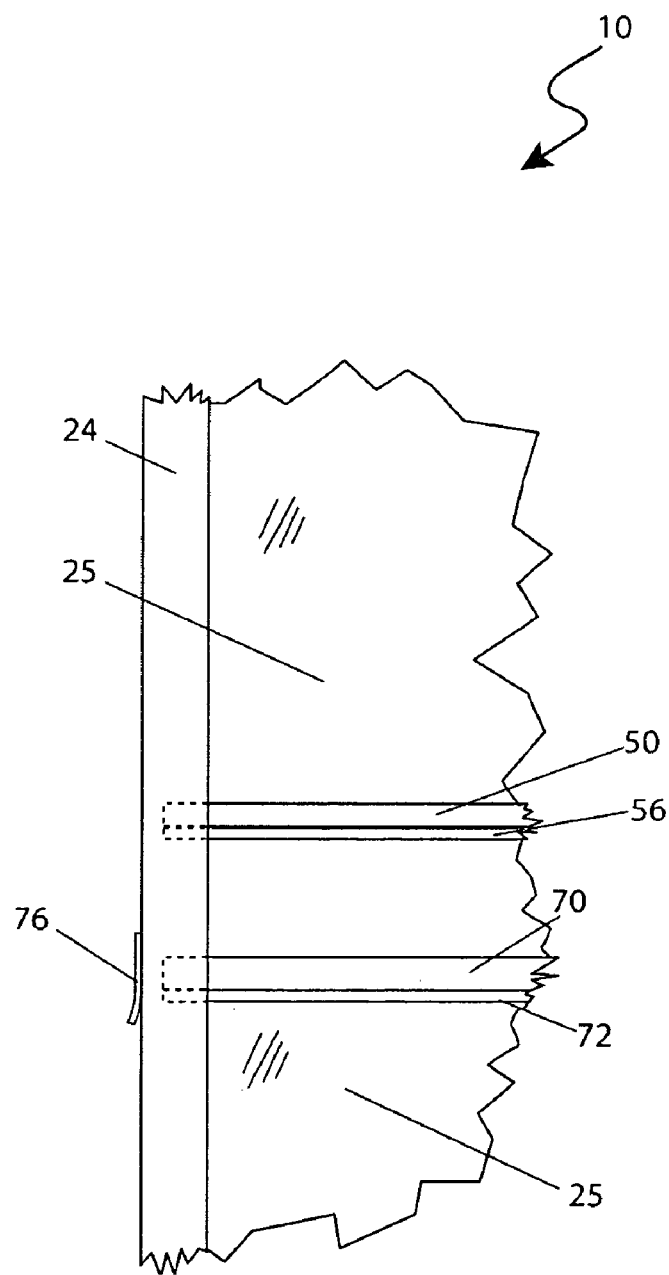
FIG. 4 is a partial side view of the device for coating reptile feed with powder 10 according to a preferred embodiment of the present invention; and, FIG. 5 is a view of the reptile feed shelf 50 according to a preferred embodiment of the present invention.

Referring now to FIG. 4, a partial side view of the device 10, according to the preferred embodiment is further disclosed. In this figure, the position of the solid insert shield 76 is disclosed in relation to the opening 74 in the rear panel 25. The solid insert shield 76 is positioned on the outside portion of the rear panel 25, above and around the opening 74 in the rear panel 25 in such a manner to prevent the escape of powder 110 from the container 20 at times when the solid insert 70 is not in place within said container 20. In the preferred embodiment the solid insert shield 76 is attached thereto the rear panel 25 and being affixed above the opening 74 using adhesives or common fasteners in such a manner as to hang dependent over the opening 74. Said solid insert shield 76 is envisioned to be constructed of plastic, cloth or another flexible material that permits the movement of the solid insert 70 into the container 20 and acts to seal the opening 74 when the solid insert 70 is not in place within the container 20.

Figure 5:
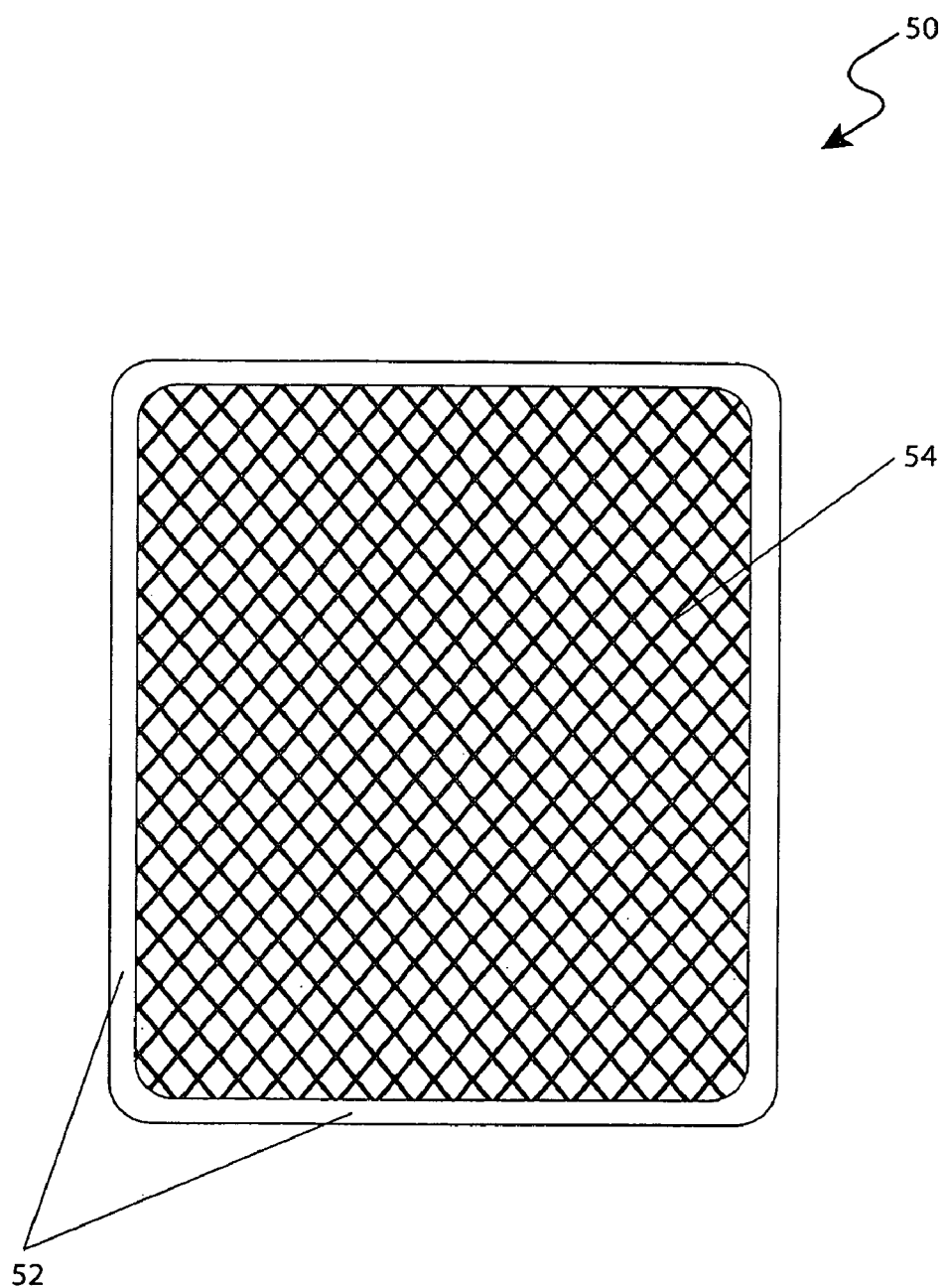

Referring to FIG. 5, a top view of the reptile feed shelf 50 of the device 10, according to a preferred embodiment is further disclosed. This figure illustrates the reptile feed shelf 50 with a reptile feed shelf screen 54 surrounded on all four sides by a reptile feed shelf frame 52. The reptile feed screen 54 may be molded directly into the reptile feed shelf frame 52 or adhesively attached thereto on top of or below the reptile feed shelf frame 52 and as such should not be considered a limiting feature of the device 10. The reptile feed shelf 50 may also be constructed of one piece of material with a plurality of apertures created thereupon so as to have the same effect as a screen 54 in permitting the passage of reptile feed powder 110 through the reptile feed shelf 54. Consequently, the use of solely a screen 54 and a frame 52 should not be considered a limiting feature of the disclosed invention.

The device for coating reptile feed 10 permits the application of any powder 110 or liquid to any form of reptile feed 100, including, but not limited to: crickets, flies, insects or other solid reptile feed 100. Powders 110 that may be applied utilizing this device include commonly available nutritional diet supplements for reptiles or medicinal powders; however, the device 10 may be utilized for any form of powder 110 or liquid material that one may wish to place on a reptile's food 100 and as such should not be viewed as a limiting restraint upon the possible uses of the device 10.

It is envisioned that other styles and configurations of the present device 10 can be easily incorporated into the teachings of the present device 10, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: insuring that the reptile feed shelf 50 is in place; lifting the lid 28 of the container 20; placing the reptile feed 100 onto the reptile feed shelf 50; dispersing the desired powder 110 through the opening at the top of the container 20; closing the lid 28 of container 10 and securely latching the lid 28 utilizing the latching mechanism 30; inverting or shaking the container 20 in such a manner as to cover the reptile feed 100; placing the container 20 in an upright position and inserting the solid insert 70 through the opening 74 in the rear panel 25 of the container 20; opening the lid 28 of the container 20 and inverting the container 20 over the reptile's feeding area; observing that only the coated reptile feed 100 leaves the container 20 and not any extraneous powder 110; returning the container 20 to an upright position; closing the container 20 utilizing the lid 28 and latching mechanism 30; removing the solid insert 70 from the container 20; discarding the remaining powder 110 into an appropriate receptacle; cleaning the device 10 as desired and storing the device 10 until needed again; and, enjoying the convenience and benefits of the device for coating reptile feed with powder 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A method for using a device for coating reptile feed with a supplement, said method comprising the steps of:
- providing said device, comprising:
  - a container defining an enclosure therein, further comprising:
    - a front panel;
    - a first side panel comprising a first shelf support;
    - a second side panel comprising a second shelf support opposite said first shelf support;
    - a rear panel comprising a rear opening;
    - a base panel providing a capture means for unused supplement; and,
    - a top opening;
  - a hinged lid located along a top rear surface of said container, thereby providing a cover to said top opening of said container;
  - a reptile feed shelf secured thereon said first shelf support and said second shelf support and comprising a plurality of apertures therein;
  - a solid insert located below said reptile feed shelf and slidingly inserted thereinto said container, thereby to prevent said unused supplement resting on said base panel from escaping through said container when said container is inverted;
  - a plurality of solid insert support rails located on opposing sides thereof said first side panel and said second side panel for supporting said solid insert located therein said container;
  - a solid insert shield removably attached thereto a rear surface of said plurality of solid insert support rails;
  - wherein said hinged lid further comprises a latching mechanism that removably attaches therewith a latch catch located thereon said front panel of said container;
  - wherein said base panel further comprises a set of four (4) feet that are attached to each bottom corner of said base panel;
  - wherein said front panel, said first side panel, said second side panel, said rear panel, and said base panel are secured together to form a box-shaped device with said top opening;
  - wherein said reptile feed shelf holds reptile feed to be coated with said supplement; and,
  - wherein said unused supplement can fall through said plurality of apertures for subsequent removal or reuse;
- insuring said reptile feed shelf is in place;
- lifting said hinged lid of said container;
- placing said reptile feed onto said reptile feed shelf;
- dispersing a desired amount of supplement through said top opening of said container, such that said supplement coats said reptile feed;
- closing said hinged lid of said container and securely latching said hinged lid utilizing said latching mechanism;
- inverting or shaking said container in such a manner as to ensure said supplement covers said reptile feed;
- placing said container in an upright position and inserting said solid insert through said rear opening in said rear panel of said container;
- opening said hinged lid of said container and inverting said container over a reptile's feeding area;
- observing that only coated reptile feed leaves said container and not any of said unused supplement;
- returning said container to an upright position; and,
- closing said container utilizing said hinged lid and said latching mechanism.

2. The method of claim 1, further comprising the additional steps of:
- removing said solid insert from said container;
- discarding said unused supplement into an appropriate receptacle; and,
- cleaning said device as desired and storing said device for subsequent use.

* * * * *